(12) United States Patent
Agostino et al.

(10) Patent No.: US 7,738,377 B1
(45) Date of Patent: Jun. 15, 2010

(54) METHOD AND APPARATUS FOR VOLUMETRIC THRESHOLDING AND ALARMING ON INTERNET PROTOCOL TRAFFIC

(75) Inventors: Myra E. Agostino, Jefferson, MD (US); Willa K. Ehrlich, Highland Park, NJ (US); David R. Gross, South River, NJ (US); Daniel F. Hurley, Marlboro, NJ (US); Jeanette LaRosa, Kingston, NJ (US); Carl B. Rexroad, Oak Ridge, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 918 days.

(21) Appl. No.: 11/438,630

(22) Filed: May 22, 2006

(51) Int. Cl.
*G01R 31/08* (2006.01)

(52) U.S. Cl. .......................... 370/233; 370/234

(58) Field of Classification Search ......... 370/229–235, 370/238–238.1, 252, 356, 400–401, 428, 370/477, 902, 61; 379/111, 112.01, 112.03–112.08, 379/112.1, 114.02
See application file for complete search history.

(56) References Cited

U.S. PATENT DOCUMENTS

| | | | | |
|---|---|---|---|---|
| 5,961,598 | A * | 10/1999 | Sime | 709/224 |
| 5,987,442 | A * | 11/1999 | Lewis et al. | 706/10 |
| 6,182,022 | B1 * | 1/2001 | Mayle et al. | 702/182 |
| 6,449,350 | B1 * | 9/2002 | Cox | 379/134 |
| 6,578,077 | B1 * | 6/2003 | Rakoshitz et al. | 709/224 |
| 6,597,777 | B1 * | 7/2003 | Ho | 379/133 |
| 6,975,963 | B2 * | 12/2005 | Hamilton et al. | 702/182 |
| 7,050,931 | B2 * | 5/2006 | Conrad | 702/177 |
| 7,133,365 | B2 * | 11/2006 | Klinker et al. | 370/238 |
| 7,212,492 | B1 * | 5/2007 | Au et al. | 370/229 |
| 7,369,506 | B1 * | 5/2008 | Croak et al. | 370/242 |
| 7,496,661 | B1 * | 2/2009 | Morford et al. | 709/224 |
| 2002/0103916 | A1 * | 8/2002 | Chen et al. | 709/229 |
| 2003/0107988 | A1 * | 6/2003 | Lodha et al. | 370/229 |
| 2004/0199791 | A1 * | 10/2004 | Poletto et al. | 713/201 |
| 2004/0221296 | A1 * | 11/2004 | Ogielski et al. | 719/313 |
| 2005/0039086 | A1 * | 2/2005 | Krishnamurthy et al. | 714/57 |
| 2007/0204034 | A1 * | 8/2007 | Rexroad et al. | 709/224 |
| 2007/0283436 | A1 * | 12/2007 | Duffield et al. | 726/23 |
| 2008/0016562 | A1 * | 1/2008 | Keeni | 726/22 |
| 2008/0198756 | A1 * | 8/2008 | Croak et al. | 370/250 |

* cited by examiner

*Primary Examiner*—Ricky Ngo
*Assistant Examiner*—Phuongchau B Nguyen

(57) ABSTRACT

A method and apparatus for analyzing traffic arriving at and/or departing from a traffic aggregate defined as a given IP-related protocol, a given port associated with a given protocol, an IP address or subset of IP addresses, or by other traffic aggregation, during a given time interval, to determine whether there is a significant increase or decrease in traffic aggregate's traffic volume as compared to the traffic aggregate's expected traffic volume are disclosed. In one embodiment, the present method defines a traffic share ratio threshold associated with a given protocol or a given protocol port or a given IP address or a given subset of IP addresses or other traffic aggregation using said collected volumetric traffic data. The present method also defines a current traffic share, a baseline traffic share and a traffic share ratio to be evaluated for the said traffic aggregate. In turn, the present method raises an alarm if the traffic aggregate's traffic share ratio to be evaluated exceeds or falls below the traffic share ratio threshold defined for the traffic aggregate.

9 Claims, 3 Drawing Sheets

US 7,738,377 B1

METHOD AND APPARATUS FOR VOLUMETRIC THRESHOLDING AND ALARMING ON INTERNET PROTOCOL TRAFFIC

The present invention relates generally to communication networks and, more particularly, to a method and apparatus for volumetric thresholding and alarming on Internet protocol (IP) traffic in communication networks, e.g., packet networks such as Internet Protocol (IP) networks.

BACKGROUND OF THE INVENTION

In order to detect excessively high traffic volumes that may be malicious, traffic thresholds for alarming on spikes in flow, packet or byte traffic arrivals at and/or departures from a given IP protocol, a given port associated with a protocol, a given IP address or subset of IP addresses, or other traffic aggregations, need to be properly defined and monitored. These thresholds are protocol-specific, specific to a port and protocol, IP address-specific, or specific to other traffic aggregations. For instance, if large volume of suspicious traffic that deviates from, whether the suspicious traffic is a significant increase or decrease when compared to the regular traffic pattern, the regular traffic pattern for a particular IP protocol, a particular port associated with a protocol, a particular IP address or subset of IP addresses, or other traffic aggregation is detected, the network needs to be able to raise an alarm to warn the network operator of the potential problem so that the appropriate actions can be taken to mitigate any potential risks.

Therefore, a need exists for a method and apparatus for volumetric thresholding and alarming in a packet network, e.g., an IP network.

SUMMARY OF THE INVENTION

In one embodiment, the present invention analyzes traffic arriving at and/or departing from a given IP protocol, a given port associated with a protocol, a given IP address or subset of IP addresses, or other traffic aggregations, during a given time interval to determine whether there is a significant increase (or decrease) in the traffic volume of the given protocol, a given port associated with a protocol, a given IP address or subset of IP addresses, or other traffic aggregations, as compared to the expected traffic volume of the given protocol, a given port associated with a protocol, a given IP address or subset of IP addresses or other traffic aggregations. For example, the present invention collects traffic data arriving at and/or departing from a given protocol, a given port associated with a protocol, a given IP address or subset of IP addresses or other traffic aggregations. The present invention uses the said collected volumetric traffic data to define a traffic threshold associated with the ratio of the observed traffic volume associated with a given IP protocol, a given port associated with a protocol, a given IP address or subset of IP addresses, or other traffic aggregation, to the expected traffic volume associated with a protocol, a given port associated with a protocol, or a given subset of IP addresses or other traffic aggregation. In turn, the present invention raises an alarm if the ratio of the current traffic volume associated with a given IP protocol, a given port associated with a protocol, a given IP address or a subset of IP addresses, or other traffic aggregation, to the expected traffic volume associated with a protocol, a given port associated with a protocol, a given IP address or subset of IP addresses, or other traffic aggregation exceeds (or falls below) the defined traffic threshold.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
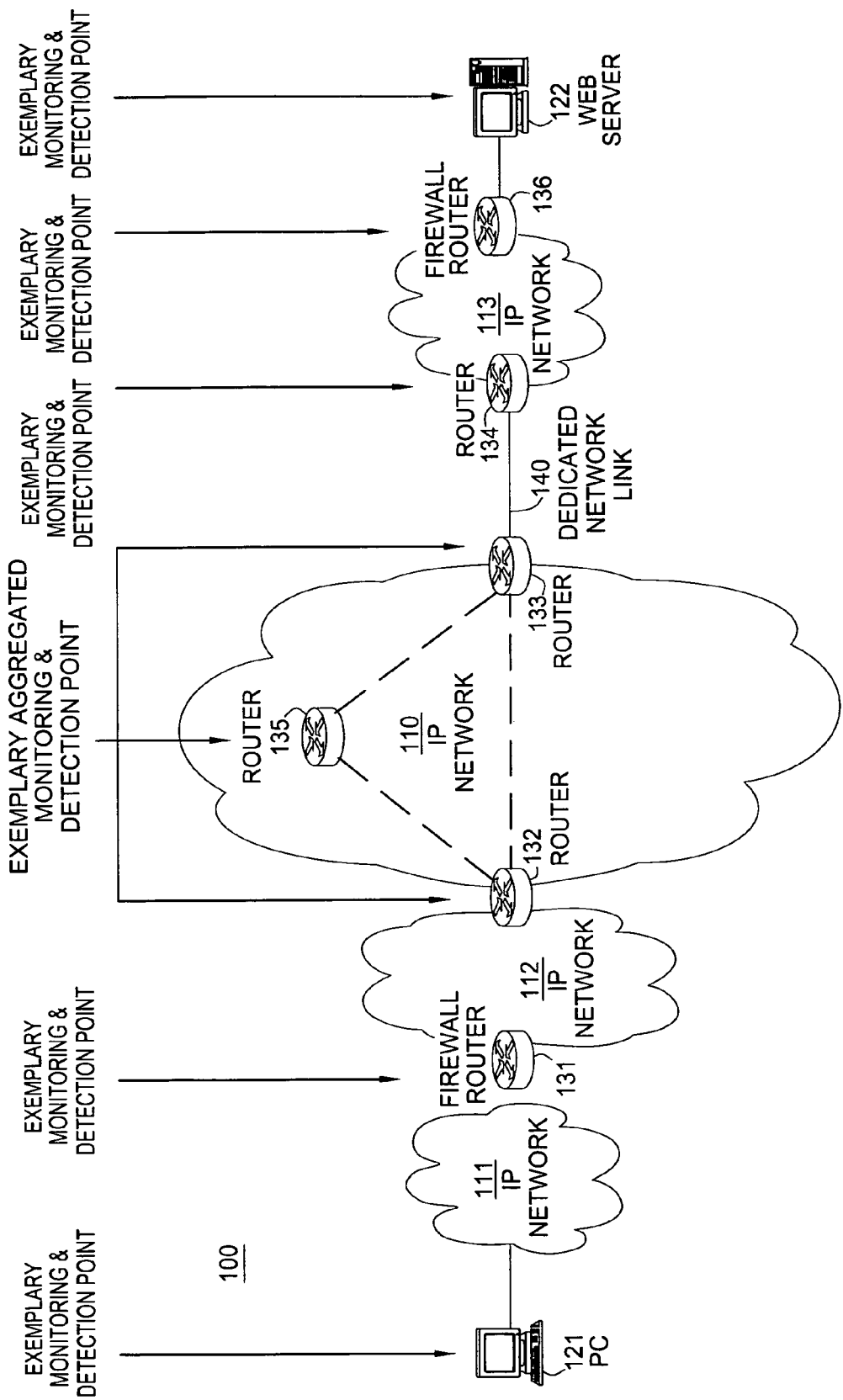
FIG. 1 illustrates an exemplary Internet Protocol (IP) network related to the present invention.

In order to detect excessively high traffic volumes that may be malicious, traffic thresholds for alarming on spikes in flow, packet or byte traffic arrivals at and/or departures from, a given protocol, a given port with respect to a given protocol, a given IP address or subset of IP addresses, or other traffic aggregation (e.g., as specified or predefined by a user or system administrator or as specified or predefined for a particular network environment or network application and the like), must be properly defined and monitored. For instance, if a large volume of suspicious traffic that deviates from the regular traffic pattern with respect to a specific protocol, a specific port associated with a protocol, or a specific IP address or subset of IP addresses, or other traffic aggregation is detected, the network needs to be able to raise an alarm to warn the network operator of the potential problem so that the appropriate actions can be taken to mitigate any potential risks. Hereafter, the protocol, the port associated with a protocol, an IP address or a subset of IP addresses, or any other traffic aggregation (e.g., as specified or predefined by a user or system administrator or as specified or predefined for a particular network environment or network application and the like) that is monitored for detection of volumetric traffic changes will be referred to as the "traffic aggregate". Traditional security systems and applications apply statistical analysis to captured packets to detect anomalous deviations in traffic profiles. Traditional techniques do not account for seasonal effects in network traffic nor address highly skewed traffic distributions. Although traditional techniques are computationally intensive, they may still not adequately address how to establish threshold values with respect to traffic arrivals at and/or traffic departures from a given traffic aggregate because these techniques do not account for:

- Seasonality effects in network traffic;
- Traffic aggregates with extremely low absolute traffic;
- Highly skewed traffic aggregate traffic data (e.g., distribution with long right tails); and
- Incomplete data collection due to downtime associated with data feed failures.

To address this criticality, in one embodiment, the present invention analyzes traffic arrivals at and/or traffic departures from a given traffic aggregate during a given time interval to determine whether there is a significant increase (or decrease) in the traffic aggregate's current traffic volume as compared to the traffic aggregate's expected traffic volume. The present invention provides a volumetric threshold to be calculated for a given traffic aggregate that:

- does not penalize traffic aggregates with very low protocol traffic usage;

takes into account seasonality effects (e.g., periodic fluctuations within a predefined time period, e.g., a 24 hour period) with respect to a traffic aggregate's usage;

takes into account trend effects with respect to a traffic aggregate's usage. (e.g., protocol usage is increasing over time);

adjusts for circuit feed failure (data feed from one or more network links being unavailable);

is not affected by distributions that may be highly skewed and therefore, are not normally distributed; and/or adjusts for the fact that some traffic aggregates may be more volatile with respect to their protocol traffic volume than other traffic aggregates.

To achieve the aforementioned benefits, in one embodiment, the present invention, defines a traffic aggregate's current traffic volume with respect to time of day and day-of-week in terms of the traffic aggregate's current traffic share. A traffic aggregate's current traffic share is expressed as the proportion of current total traffic volume that is attributable to the traffic aggregate.

For example, if the traffic aggregate is with respect to a given protocol, then the traffic aggregate's current traffic share is expressed as the proportion of the current total traffic volume attributable to the given protocol, where current total traffic volume is defined as the current traffic summed over all 256 IP protocols.

As another example, if the traffic aggregate is with respect to a specific port associated with a given protocol, then the traffic aggregate's current traffic share can be expressed as the proportion of current total traffic volume attributable to traffic arrivals at and/or traffic departures from the specific protocol port. In one case, the current total traffic volume can be defined as the current traffic summed over all 256 IP protocols, while, in a second, case, the current total traffic volume can be defined as the current total traffic attributable to that protocol.

As another example, if the traffic aggregate is with respect to a specific IP address or subset of IP addresses, then the traffic aggregate's current traffic share can be expressed as the proportion of current total traffic volume attributable to traffic arrivals at and/or traffic departures from the IP address or subset of IP addresses, where current total traffic volume is defined as the current traffic summed over all 256 IP protocols.

defines a traffic aggregate's baseline traffic volume based on prior observations collected during the same time of day and day of week as the traffic aggregate's current traffic volume.

defines a traffic aggregate's baseline traffic volume with respect to time of day and day-of-week in terms of the traffic aggregate's baseline traffic share. A traffic aggregate's baseline traffic share is defined as some average of the traffic aggregate's traffic shares for some N prior observations collected during the same time of day and day-of-week as the traffic aggregate's current traffic share For example, if the traffic aggregate is with respect to a given protocol, then the traffic aggregate's baseline traffic share would be defined as some average of the protocol's traffic shares for some N prior observations collected during the same time of day and day-of-week as the protocol's current traffic share.

As another example, if the traffic aggregate is with respect with a specific port associated with a given protocol, then the traffic aggregate's baseline traffic share would be defined as some average of the protocol port's traffic shares for some N prior observations collected during the same time of day and day-of-week as the protocol port's current traffic share.

As another example, if the traffic aggregate is with respect to a specific IP address or subset of IP addresses, then the traffic aggregate's baseline traffic share would be defined as some average of the IP address or subset of IP addresses traffic shares for some N prior observations collected during the same time of day and day-of-week as the IP address or subset of IP addresses current traffic share.

uses a traffic aggregate's traffic share value instead of the traffic aggregate's absolute traffic counts value to measure traffic volume associated with a traffic aggregate so that the traffic aggregate's traffic volume value should remain invariant despite a circuit failure within the network analyzes the ratio of the traffic aggregate's current traffic share and the traffic aggregate's baseline traffic share, called the traffic aggregate's traffic share ratio, so that an alarm might be raised even though the traffic aggregate's current traffic share was extremely low (e.g., $10^{-4}$, but much larger, let us say, 10,000 times larger, than the traffic aggregate's baseline traffic share of $10^{-8}$)

defines a traffic aggregate's threshold based on the distribution of the traffic aggregate's traffic share ratios so that a volatile traffic aggregate will have a higher threshold.

FIG. 1 illustrates an exemplary Internet Protocol (IP) network 100 related to the present invention. In FIG. 1, network 100 comprises IP networks 110, 111, 112, and 113. IP network 111 is connected to IP network 112 via firewall router 131. IP network 112 is connected to IP network 110 via router 132. IP network 110 is connected to IP network 113 via router 133 and router 134 with a network link between router 133 and router 134. Router 133 and router 134 are connected via dedicated network link 140. IP network 110 comprises router 132, router 133, and router 135. Router 132 has connectivity to router 133 and router 135; router 133 has connectivity to router 132 and router 135; and router 135 has connectivity to router 132 and router 133. Endpoint device, Personal Computer 121, is connected to IP network 111 directly. Endpoint device, e.g., Web Server 122, is connected to IP network 135 via a firewall device, firewall 136. The present invention can be applied to any network component or collection of network components within network 100 to monitor and detect a volumetric traffic spike if there is a significant increase in a traffic aggregate's observed traffic volume as compared to a traffic aggregate's expected traffic volume. For instance, the present invention can be applied independently and individually to PC 121, Firewall Router 131, Router 132, Router 133, Router 134, Router 135, Firewall 136 and Web Server 122 to detect a volumetric traffic spike associated with a traffic aggregate corresponding to a specific protocol or to a specific port associated with a specific protocol or to a specific IP address or collection of IP addresses. Moreover, as shown in FIG. 1, the present invention can be applied to an aggregation of network hosts, such as Router 132, Router 133 and Router 135, collectively, at the same time, to detect a volumetric traffic spike associated with various traffic aggregates as indicated above.

In one embodiment, the present invention is applied to traffic for a given protocol aggregated over all port numbers for that protocol for a given host or an aggregation of hosts. Thus, volumetric thresholding and alarming are applied to traffic associated with all ports for a given protocol for a given host or for an aggregation of hosts.

In another embodiment, the present invention is applied to traffic with respect to a given protocol arriving at and/or departing from a given port for a given host or an aggregation of hosts. Thus, volumetric thresholding and alarming are applied to protocol traffic associated with a given port for a given host or an aggregation of hosts. The port number on which the volumetric traffic increase, or decrease, is to be monitored and detected, is a specification of an application process, in the case of TCP and UDP IP protocols, or in the case of other IP protocols, such as ICMP, the port number refers to the message type.

In another embodiment, the present invention is applied to traffic arriving at and/or departing from a given IP address or subset of IP addresses for a given host or an aggregation of hosts. Thus, volumetric thresholding and alarming are applied to all traffic associated with a given IP address or subset of IP addresses for a given host or for an aggregation of hosts.

It should be noted that for various protocols, such as ICMP, "port" may not be a proper or supported parameter. In these protocols, ports can be deemed to be message types. It should be noted that the term "port" in the present invention should be broadly interpreted to include message type as well.

The present invention can also be applied to a basic component to enforce a company's security policy such as firewall devices. Firewall devices are used to restrict access to one network from another network. There are also firewalls that restrict access to one network segment from another network segment within a network. A firewall is a gateway that can be a router, a server, an authentication server or a specialized hardware device. It monitors packets arriving at and departing from the network or network segment that it is monitoring. It filters out packets that do not meet the company's security policy. Current filtering criteria include, but are not limited to, source and destination addresses, ports, protocol type, sequence bits, and responses to outgoing requests. The present invention enables the packet filtering criteria to be extended to include filtering packets associated with protocols that specify source, destination ports (i.e., TCP and UDP protocols) with respect to a port whose current traffic share very much exceeds the port's baseline traffic share. Consequently, the present invention provides a real-time and proactive approach to control and filter excessive traffic volumes arriving or departing a network.

Many security intrusion events result in increases in Internet traffic with respect to a given traffic aggregate that is not typically used, resulting in a relative as opposed to an absolute increase in the magnitude of traffic with respect to that traffic aggregate. If these traffic aggregates are not typically used, then this represents a relative as opposed to an absolute traffic increase. The present invention helps a security organization in establishing volumetric traffic thresholds with respect to a given traffic aggregate to alarm on.

Figure 2:
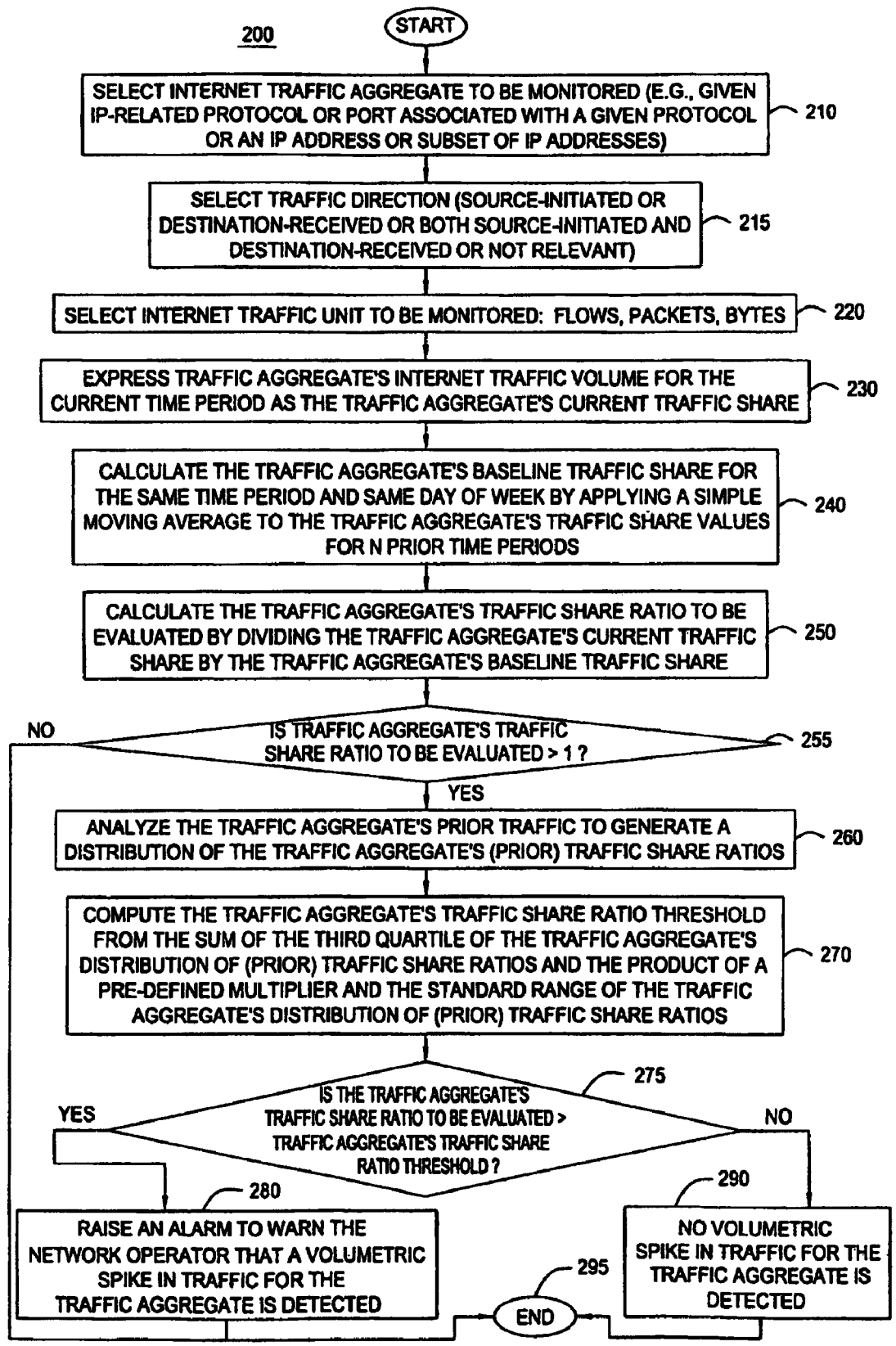
FIG. 2 illustrates a flowchart of a method for volumetric thresholding and alarming in a packet network, e.g., an IP network, of the present invention.

FIG. 2 illustrates a flowchart of a method 200 for volumetric thresholding and alarming in a packet network, e.g., an IP network, of the present invention. In one embodiment, the present invention analyzes traffic arriving at and/or departing from a given traffic aggregate during a given time interval for a given time of week for a given host or over a set of hosts and determines whether there is a significant increase in the traffic aggregate's current traffic share as compared to the traffic aggregate's baseline or expected traffic share. If the traffic aggregate's current traffic share represents a significant volumetric increase over the traffic aggregate's baseline traffic share in terms of exceeding the traffic aggregate's traffic share ratio threshold, then an alarm is generated against the traffic aggregate. Traffic units to be analyzed include, but are not limited to, flow, packet or byte. Namely, any other traffic units can be adapted for use with the present invention. Method 200 starts with step 210.

In step 210, the method selects the traffic aggregate to be monitored for volumetric traffic spike. Note again that a traffic aggregate refers to a specific protocol, a specific port associated with a given protocol, a given IP address or subset of IP addresses, or other traffic aggregation (e.g., as specified or predefined by a user or system administrator or as specified or predefined for a particular network environment or network application and the like) for which traffic data will be collected and monitored for volumetric traffic changes. Internet protocol includes, but is not limited to, TCP and UDP. In one embodiment, the port is the port number of the Internet related protocol on which the volumetric traffic spike is to be monitored and detected. For example, the value of the port parameter may range from 0 to 65535. Furthermore, in certain protocols, the parameter port can be replaced by message type.

In step 215, the method selects the traffic direction to be monitored which is, in part, a function of the unit of traffic aggregation selected in step 210. Thus, if the traffic aggregate selected to be monitored for volumetric traffic spike (in step 210) is a specific protocol, then traffic direction is not relevant. In contrast, if the traffic aggregate selected in step 210 is specific port associated with a given protocol, a given IP address or subset of IP addresses, then the traffic direction to be monitored must be specified to be either source-initiated, destination-received or both source initiated and destination-received. In step 220, the method selects the internet traffic unit to be monitored for the given traffic aggregate. Internet traffic unit includes, but is not limited to, flow, packet, or byte.

In step 230, the method expresses a traffic aggregate's current volume of traffic that is arriving at and/or departing from the traffic aggregate as the traffic aggregate's current traffic share. This is defined as the proportion of the current total traffic count, for the current time of day and day of week, attributed to the traffic aggregate's traffic count. For example, if the traffic aggregate is with respect to a given protocol, then the traffic aggregate's current traffic share is expressed as the proportion of the current total traffic volume attributable to the given protocol's traffic volume, where current total traffic volume is defined as the current traffic summed over all 256 IP protocols. As another example, if the traffic aggregate is with respect to a specific port associated with a given protocol, then the traffic aggregate's current traffic share can be expressed as the proportion of current total traffic volume attributable to traffic arrivals at and/or traffic departures from the specific protocol port. In one case, the current total traffic volume can be defined as the current traffic summed over all 256 IP protocols, while, in a second case, the current total traffic volume can be defined as the current total traffic attributable to that protocol. As another example, if the traffic aggregate is with respect to a specific IP address or subset of IP addresses, then the traffic aggregate's current traffic share can be expressed as the proportion of current total traffic volume attributable to traffic arrivals at and/or traffic departures from the IP address or subset of IP addresses, where current total traffic volume is defined as the current traffic summed over all 256 IP protocols. The length of the time period is a configurable parameter set by the network operator.

In step 240, the method, in one embodiment, calculates the traffic aggregate's baseline traffic share as a simple moving average (SMA) of the traffic shares for N (where N is in integer) prior time periods, where these time periods represent the same time period of the day and the day of week as the time period in the traffic aggregate's current traffic share. This averaging technique is called moving average since as new observations are added, the old observations will be subtracted and the moving average window will continue to slide forward over time. A moving average technique is desirable because it smoothes a data series. N is a configurable parameter set by the network operator. If traffic with respect to as given traffic aggregate were very volatile and this volatility needs to be ignored or smoothed, the number of time periods in the traffic aggregate's baseline time share computation can be lengthened to decrease the SMA sensitivity. If, on the other hand, the traffic volatility for the traffic aggregate needs to be captured, the number of time periods in the traffic aggregate's baseline traffic share computation can be shortened to increase the SMA sensitivity. In another embodiment, Exponential Moving Average (EMA) that puts more weight on recent time periods, so that it reacts quicker to recent traffic changes as compared to a SMA, is used to compute the traffic aggregate's baseline traffic share. In another embodiment, other approaches are available for smoothing a time-series such as for example, a decomposition of a time-series into a trend component, a seasonal component and a random component, and then adjusting the current and baseline traffic with respect to the seasonal component.

In step 250, the method uses the ratio of these two previously obtained proportions, i.e., the traffic aggregate's current traffic share divided by the traffic aggregate's baseline traffic share, to calculate the traffic aggregate's traffic share ratio to be evaluated.

In step 255, the method queries whether the traffic aggregate's traffic share ratio to be evaluated is greater or equal to one. If the query is positively answered, then the method proceeds to step 260. If the query is negatively answered, then method ends in step 295.

In step 260, the method computes a set of historical traffic share ratios over a predefined period of time, e.g., over the last 2016 hours corresponding to the past 12 weeks, for the given traffic aggregate so that a distribution of traffic aggregate traffic share ratios can be generated. The predefined period of time is a configurable parameter set by the network operator.

In step 270, the method uses the distribution of a traffic aggregate traffic share ratios that are greater than or equal to one to determine whether the traffic aggregate's traffic share ratio to be evaluated can be considered to be an outlier at the upper end of the traffic aggregate's distribution of traffic share ratios. A threshold is calculated that corresponds to sum of the third quartile (or $75^{th}$ percentile) of this distribution and a multiplier, M, applied to the standard range of the distribution. The standard range is defined as 1.5*(inter-quartile range) and the inter-quartile range is defined as the difference between the third quartile (or $75^{th}$ percentile) and the first quartile (the $25^{th}$ percentile) of a distribution. M is a configurable parameter set by the network operator.

In step 275, the method checks if the traffic aggregate's traffic share ratio to be evaluated is greater than the threshold value defined in step 270. If the traffic aggregate's traffic share ratio to be evaluated is greater than the threshold value defined in step 270, then the traffic aggregate's current traffic volume is considered to represent a significant volumetric increase, or volumetric traffic spike, and the method proceeds to step 280; otherwise, the method proceeds step 290.

In step 280, the method raises an alarm to warn the network operator that a volumetric spike in the traffic aggregate's current traffic volume is detected.

In step 290, the method determines that there is no volumetric spike in the traffic aggregate's current traffic volume. The method ends in step 295.

It should be noted that method 200 is not intended to limit the present invention as teaching dynamic threshold calculation. Namely, a static computation of the threshold can be implemented, e.g., skipping steps 260 and 270 for a predefined period of cycles. This predefined period of cycles is a configurable parameter set by the network operator.

It should be noted that although the above disclosure is provided in the context of detecting volumetric increases, the present invention is not so limited. Namely, it is equally valid to be concerned with substantial volumetric decreases, e.g., where a traffic aggregate's current traffic share is much lower than the traffic aggregate's baseline traffic share. In this situation, a proper volumetric decrease threshold can be generated for identifying such situations. For example, for a given traffic aggregate, one can uses the distribution of traffic share ratios that are less than one to determine whether the traffic aggregate's traffic share ratio to be evaluated can be considered to be an outlier at the lower end of the distribution of traffic share ratios for the traffic aggregate. A volumetric decrease threshold is calculated that corresponds to difference of the first quartile (or $25^{th}$ percentile) of this distribution and a multiplier, P, applied to the standard range of the distribution. The standard range is defined as 1.5*(inter-quartile range) and the inter-quartile range is defined as the difference between the third quartile (or $75^{th}$ percentile) and the first quartile (the $25^{th}$ percentile) of a distribution. P is a configurable parameter set by the network operator. If the traffic aggregate's traffic share ratio to be evaluated is less than the volumetric decrease threshold, then a volumetric decrease in traffic for the given traffic aggregate is detected.

Figure 3:
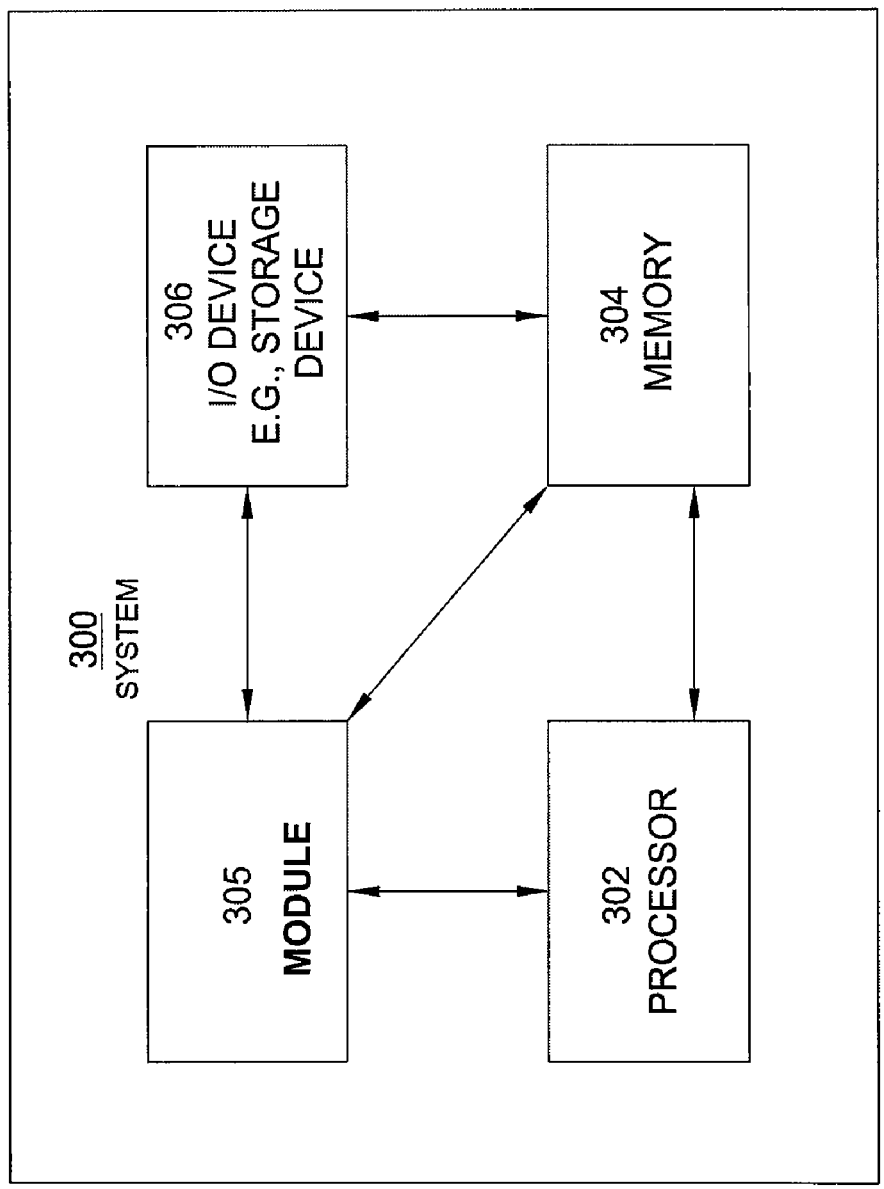
FIG. 3 illustrates a high level block diagram of a general purpose computer suitable for use in performing the functions described herein.

FIG. 3 depicts a high level block diagram of a general purpose computer suitable for use in performing the functions described herein. As depicted in FIG. 3, the system 300 comprises a processor element 302 (e.g., a CPU), a memory 304, e.g., random access memory (RAM) and/or read only memory (ROM), a module 305 for volumetric thresholding and alarming on IP traffic, and various input/output devices 306 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 305 for volumetric thresholding and alarming on IP traffic can be loaded into memory 304 and executed by processor 302 to implement the functions as discussed above. As such, the present process 305 for volumetric thresholding and alarming on IP traffic (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for generating an alarm in a communication network, comprising:
    collecting volumetric protocol traffic data for a given traffic aggregate;
    defining a traffic aggregate's traffic share ratio threshold using said collected volumetric protocol traffic data; and
    raising an alarm if a traffic aggregate's traffic share ratio to be evaluated exceeds or falls below said defined traffic share ratio threshold, wherein said traffic aggregate's traffic share ratio to be evaluated is generated in accordance with:
        calculating a traffic aggregate's current traffic share;
        calculating a traffic aggregate's baseline traffic share; and
        calculating said traffic aggregate's traffic share ratio to be evaluated from said traffic aggregate's current traffic share and said traffic aggregate's baseline traffic share, wherein said traffic aggregate's traffic share ratio to be evaluated is obtained by dividing said traffic aggregate's current traffic share by said traffic aggregate's baseline traffic share, wherein said collecting, said defining, or said raising is performed by a processor.

2. The method of claim 1, wherein said traffic aggregate's current traffic share is a proportion of protocol traffic count attributed to said given traffic aggregate for a current time period.

3. A method for generating an alarm in a communication network, comprising:
    collecting volumetric protocol traffic data for a given traffic aggregate;
    defining a traffic aggregate's traffic share ratio threshold using said collected volumetric protocol traffic data, wherein said defining comprises:
        generating a distribution of historical traffic share ratios for said traffic aggregate over a predefined period of time; and
        using said distribution of traffic share ratios for the traffic aggregate for computing said traffic share ratio threshold, wherein said using comprises:
            computing said traffic aggregate's traffic share ratio threshold as a volumetric increase threshold that corresponds to a sum of a $75^{th}$ percentile value in said traffic aggregate's distribution of traffic share ratios that are greater than or equal to one and a product of a multiplier, M, times a standard range of said traffic aggregate's distribution of traffic share ratios that are greater than or equal to one; or
            computing said traffic aggregate's traffic share ratio threshold as a volumetric decrease threshold that corresponds to a difference of a $25^{th}$ percentile value in said traffic aggregate's distribution of traffic share ratios that are smaller than one and a product of a multiplier, P, times a standard range of said traffic aggregate's distribution of traffic share ratios that are smaller than one; and
    raising an alarm if a traffic aggregate's traffic share ratio to be evaluated exceeds or falls below said defined traffic share ratio threshold, wherein said traffic aggregate's traffic share ratio to be evaluated is generated in accordance with:
        calculating a traffic aggregate's current traffic share;
        calculating a traffic aggregate's baseline traffic share; and
        calculating said traffic aggregate's traffic share ratio to be evaluated from said traffic aggregate's current traffic share and said traffic aggregate's baseline traffic share, wherein said collecting, said defining, or said raising is performed by a processor.

4. A computer-readable storage medium having stored thereon a plurality of instructions, the plurality of instructions including instructions which, when executed by a processor, cause the processor to perform the steps of a method for generating an alarm in a communication network, comprising:
    collecting volumetric protocol traffic data for a given traffic aggregate;
    defining a traffic aggregate's traffic share ratio threshold using said collected volumetric protocol traffic data; and
    raising an alarm if a traffic aggregate's traffic share ratio to be evaluated exceeds or falls below said defined traffic share ratio threshold, wherein said traffic aggregate's traffic share ratio to be evaluated is generated in accordance with:
        calculating a traffic aggregate's current traffic share;
        calculating a traffic aggregate's baseline traffic share; and
        calculating said traffic aggregate's traffic share ratio to be evaluated from said traffic aggregate's current traffic share and said traffic aggregate's baseline traffic share, wherein said traffic aggregate's traffic share ratio to be evaluated is obtained by dividing said traffic aggregate's current traffic share by said traffic aggregate's baseline traffic share.

5. The computer-readable medium of claim 4, wherein said traffic aggregate's current traffic share is a proportion of protocol traffic count attributed to said given traffic aggregate for a current time period.

6. An apparatus for generating an alarm in a communication network, comprising:
    means for collecting volumetric protocol traffic data for a given traffic aggregate;
    means for defining a traffic aggregate's traffic share ratio threshold using said collected volumetric protocol traffic data; and
    means for raising an alarm if a traffic aggregate's traffic share ratio to be evaluated exceeds or falls below said defined traffic share ratio threshold,
    wherein said traffic aggregate's traffic share ratio to be evaluated is generated in accordance with:
        calculating a traffic aggregate's current traffic share;
        calculating a traffic aggregate's baseline traffic share; and
        calculating said traffic aggregate's traffic share ratio to be evaluated from said traffic aggregate's current traffic share and said traffic aggregate's baseline traffic share, wherein said traffic aggregate's traffic share ratio to be evaluated is obtained by dividing said traffic aggregate's current traffic share by said traffic aggregate's baseline traffic share.

7. The apparatus of claim 6, wherein said traffic aggregate's current traffic share is a proportion of protocol traffic count attributed to said given traffic aggregate for a current time period.

8. An apparatus for generating an alarm in a communication network, comprising:
    means for collecting volumetric protocol traffic data for a given traffic aggregate;
    means for defining a traffic aggregate's traffic share ratio threshold using said collected volumetric protocol traffic data, wherein said means for defining comprises:
        means for generating a distribution of historical traffic share ratios for said traffic aggregate over a predefined period of time; and means for using said distribution of traffic share ratios for the traffic aggregate for computing said traffic share ratio threshold, wherein said means for using comprises:

means for computing said traffic aggregate's traffic share ratio threshold as a volumetric increase threshold that corresponds to a sum of a $75^{th}$ percentile value in said traffic aggregate's distribution of traffic share ratios that are greater than or equal to one and a product of a multiplier, M, times a standard range of said traffic aggregate's distribution of traffic share ratios that are greater than or equal to one; or means for computing said traffic aggregate's traffic share ratio threshold as a volumetric decrease threshold that corresponds to a difference of a $25^{th}$ percentile value in said traffic aggregate's distribution of traffic share ratios that are smaller than one and a product of a multiplier, P, times a standard range of said traffic aggregate's distribution of traffic share ratios that are smaller than one; and means for raising an alarm if a traffic aggregate's traffic share ratio to be evaluated exceeds or falls below said defined traffic share ratio threshold, wherein said traffic aggregate's traffic share ratio to be evaluated is generated in accordance with:

calculating a traffic aggregate's current traffic share;

calculating a traffic aggregate's baseline traffic share; and calculating said traffic aggregate's traffic share ratio to be evaluated from said traffic aggregate's current traffic share and said traffic aggregate's baseline traffic share.

9. A computer-readable storage medium having stored thereon a plurality of instructions, the plurality of instructions including instructions which, when executed by a processor, cause the processor to perform the steps of a method for generating an alarm in a communication network, comprising:

collecting volumetric protocol traffic data for a given traffic aggregate;

defining a traffic aggregate's traffic share ratio threshold using said collected volumetric protocol traffic data, wherein said defining comprises:

generating a distribution of historical traffic share ratios for said traffic aggregate over a predefined period of time; and using said distribution of traffic share ratios for the traffic aggregate for computing said traffic share ratio threshold, wherein said using comprises:

computing said traffic aggregate's traffic share ratio threshold as a volumetric increase threshold that corresponds to a sum of a $75^{th}$ percentile value in said traffic aggregate's distribution of traffic share ratios that are greater than or equal to one and a product of a multiplier, M, times a standard range of said traffic aggregate's distribution of traffic share ratios that are greater than or equal to one; or computing said traffic aggregate's traffic share ratio threshold as a volumetric decrease threshold that corresponds to a difference of a $25^{th}$ percentile value in said traffic aggregate's distribution of traffic share ratios that are smaller than one and a product of a multiplier, P, times a standard range of said traffic aggregate's distribution of traffic share ratios that are smaller than one; and raising an alarm if a traffic aggregate's traffic share ratio to be evaluated exceeds or falls below said defined traffic share ratio threshold, wherein said traffic aggregate's traffic share ratio to be evaluated is generated in accordance with:

calculating a traffic aggregate's current traffic share;

calculating a traffic aggregate's baseline traffic share; and calculating said traffic aggregate's traffic share ratio to be evaluated from said traffic aggregate's current traffic share and said traffic aggregate's baseline traffic share.

\* \* \* \* \*